US008727869B1

(12) United States Patent
O'Brien

(10) Patent No.: US 8,727,869 B1
(45) Date of Patent: *May 20, 2014

(54) METHOD, APPARATUS, AND COMPUTER-READABLE MEDIA FOR ENABLING REAL-TIME COMPETITION HAVING AN ENTERTAINING EXPERIENCE BASED ON COMMODITIES OR CURRENCIES

(71) Applicant: Iconic Worldwide Gaming Limited, Manchester (GB)

(72) Inventor: Patrick Damien O'Brien, Cheshire (GB)

(73) Assignee: Iconic Worldwide Gaming-Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,569

(22) Filed: May 22, 2013

Related U.S. Application Data

(60) Provisional application No. 61/810,582, filed on Apr. 10, 2013, provisional application No. 61/812,719, filed on Apr. 16, 2013, provisional application No. 61/815,112, filed on Apr. 23, 2013.

(51) Int. Cl.
*G06F 17/00* (2006.01)
*G06F 19/00* (2011.01)

(52) U.S. Cl.
USPC ........... 463/25; 463/31; 705/36 R; 705/37; 700/91

(58) Field of Classification Search
USPC ............ 463/16–20, 25, 40–43, 9, 29–31; 705/36 R, 37; 700/91–93
See application file for complete search history.

(56) References Cited

U.S. PATENT DOCUMENTS 5,608,620 A * 3/1997 Lundgren ............... 705/1.1
5,749,785 A * 5/1998 Rossides ............... 463/25

(Continued)

FOREIGN PATENT DOCUMENTS

GB 2399992 A 9/2004
WO 2011098905 A1 8/2011

OTHER PUBLICATIONS

International Search Report and Written Opinion of the International Searching Authority corresponding to International Application No. PCT/IB2013/001563, Nov. 29, 2013.

(Continued)

*Primary Examiner* — Milap Shah
(74) *Attorney, Agent, or Firm* — Stephen M. Hertzler; Reed Smith LLP

(57) ABSTRACT

Methods, apparatus, and computer-readable media for enabling real-time competition based on commodities. An exemplary computer-implemented method executed by one or more computing devices for enabling real-time competition based on commodities includes receiving information from a first user including a selection of a commodity and a competitive position corresponding to a criteria associated with the commodity, determining, based at least in part on real-time information regarding the selected commodity, whether the competitive position regarding the criteria is consistent with the real-time information, transmitting information to the first user indicating an outcome that is favorable based at least in part of a determination that the competitive position regarding the criteria is consistent with the real-time information, and transmitting information to the first user indicating an outcome that is not favorable based at least in part of a determination that the competitive position regarding the criteria is not consistent with the real-time information.

21 Claims, 20 Drawing Sheets

(56) References Cited

U.S. PATENT DOCUMENTS

| | | | |
|---|---|---|---|
| 6,236,900 B1* | 5/2001 | Geiger | 700/91 |
| 6,473,084 B1* | 10/2002 | Phillips et al. | 345/440 |
| 6,659,861 B1 | 12/2003 | Faris et al. | |
| 6,709,330 B1* | 3/2004 | Klein et al. | 463/9 |
| 7,040,982 B1* | 5/2006 | Jarvis et al. | 463/9 |
| 7,693,778 B2* | 4/2010 | Nafeh | 705/37 |
| 8,086,510 B2* | 12/2011 | Amaitis et al. | 705/35 |
| 8,118,654 B1* | 2/2012 | Nicolas et al. | 463/9 |
| 8,275,694 B2* | 9/2012 | Tzroya | 705/37 |
| 8,568,222 B2* | 10/2013 | Gagner et al. | 463/25 |
| 2001/0032169 A1* | 10/2001 | Sireau | 705/37 |
| 2002/0013762 A1 | 1/2002 | Yoshimi et al. | |
| 2002/0073021 A1* | 6/2002 | Ginsberg et al. | 705/38 |
| 2002/0153656 A1* | 10/2002 | Maksymec et al. | 273/138.1 |
| 2002/0155885 A1* | 10/2002 | Shvili | 463/25 |
| 2003/0204566 A1 | 10/2003 | Dhupelia et al. | |
| 2004/0204232 A1* | 10/2004 | Asher et al. | 463/25 |
| 2005/0003878 A1* | 1/2005 | Updike | 463/16 |
| 2005/0027643 A1* | 2/2005 | Amaitis et al. | 705/37 |
| 2005/0116410 A1* | 6/2005 | Vlazny et al. | 273/139 |
| 2005/0197938 A1* | 9/2005 | Davie et al. | 705/35 |
| 2005/0197939 A1* | 9/2005 | Davie et al. | 705/35 |
| 2005/0197948 A1* | 9/2005 | Davie et al. | 705/37 |
| 2005/0208996 A1* | 9/2005 | Friedman | 463/25 |
| 2005/0245308 A1* | 11/2005 | Amaitis et al. | 463/20 |
| 2005/0245310 A1* | 11/2005 | Amaitis et al. | 463/20 |
| 2006/0014583 A1* | 1/2006 | Harris et al. | 463/25 |
| 2006/0105839 A1 | 5/2006 | Graeve et al. | |
| 2006/0105840 A1* | 5/2006 | Graeve | 463/42 |
| 2006/0199631 A1* | 9/2006 | McGill et al. | 463/16 |
| 2007/0265092 A1* | 11/2007 | Betteridge | 463/42 |
| 2009/0061995 A1* | 3/2009 | Assia et al. | 463/25 |
| 2009/0062016 A1* | 3/2009 | Assia et al. | 463/42 |
| 2010/0035673 A1* | 2/2010 | Kertcher et al. | 463/9 |
| 2010/0144425 A1* | 6/2010 | Dannenberg | 463/25 |
| 2011/0098096 A1* | 4/2011 | Odom et al. | 463/17 |
| 2012/0178535 A1* | 7/2012 | Short | 463/42 |

OTHER PUBLICATIONS

International Search Report and Written Opinion of the International Searching Authority corresponding to International Application No. PCT/IB2013/001485, Oct. 22, 2013.

Notice from the European Patent Office dated Oct. 1, 2007 concerning business methods, Official Journal of the European Patent Office, Munchen, DE vol. 30, No. 11, Nov. 1, 2007, pp. 592-593, XP007905525, ISSN: 0170-9291.

* cited by examiner

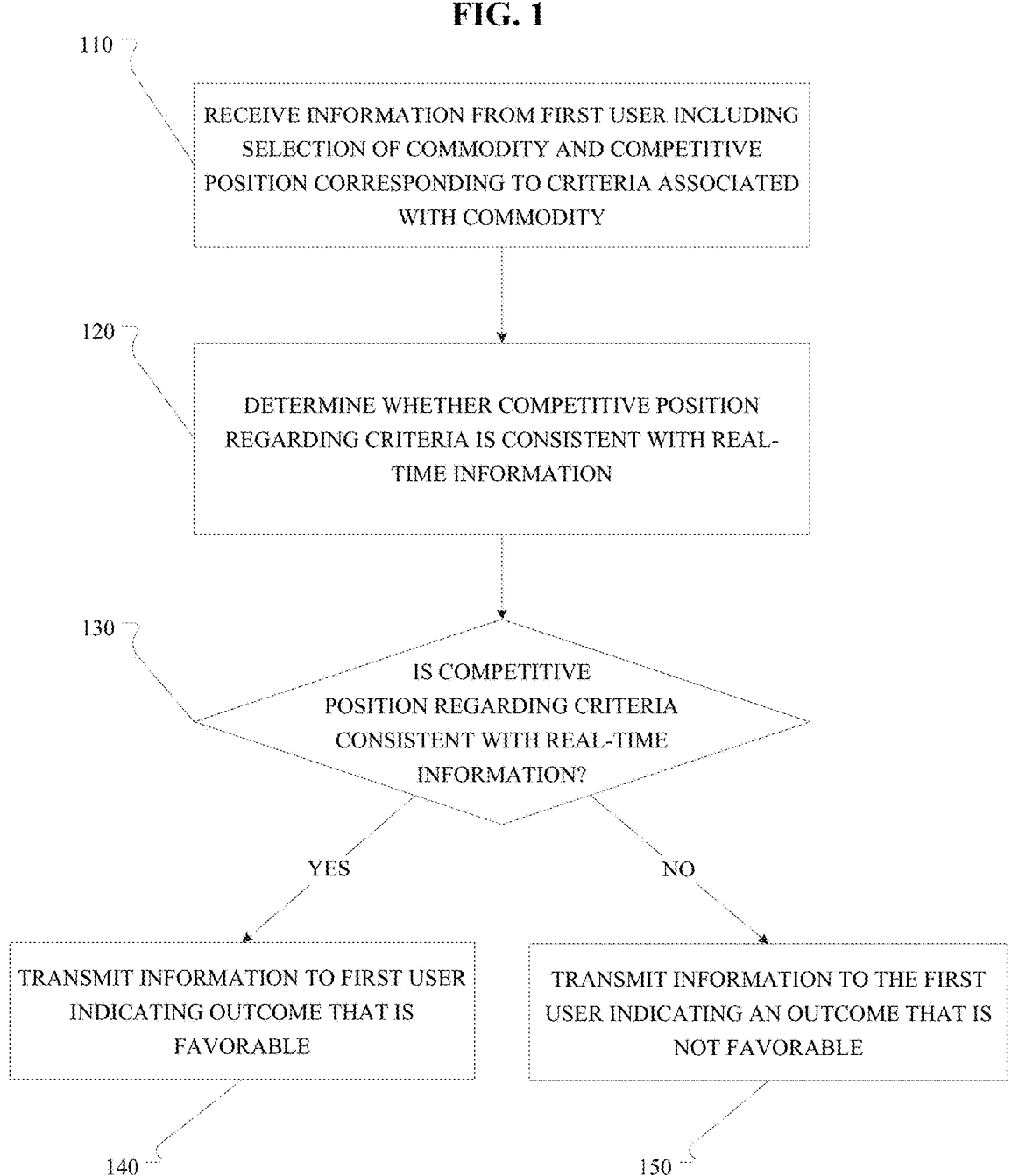

METHOD, APPARATUS, AND COMPUTER-READABLE MEDIA FOR ENABLING REAL-TIME COMPETITION HAVING AN ENTERTAINING EXPERIENCE BASED ON COMMODITIES OR CURRENCIES

RELATED APPLICATION DATA

This application claims priority to Provisional Application Nos. 61/810,582, filed Apr. 10, 2013, 61/812,719, filed Apr. 16, 2013, and 61/815,112, filed Apr. 23, 2013, the entire contents of which are included herein by reference.

FIELD OF THE INVENTION

The disclosed embodiment relates to methods, apparatus, and computer-readable media for enabling real-time competition based on commodities.

SUMMARY

The disclosed embodiment relates to methods, apparatus, and computer-readable media for enabling real-time competition based on commodities. An exemplary computer-implemented method executed by one or more computing devices for enabling real-time competition based on commodities according to the disclosed embodiment includes, for example, receiving information from a first user including a selection of a commodity and a competitive position corresponding to a criteria associated with the commodity, determining, based at least in part on real-time information regarding the selected commodity, whether the competitive position regarding the criteria is consistent with the real-time information, transmitting information to the first user indicating an outcome that is favorable based at least in part of a determination that the competitive position regarding the criteria is consistent with the real-time information, and transmitting information to the first user indicating an outcome that is not favorable based at least in part of a determination that the competitive position regarding the criteria is not consistent with the real-time information.

As disclosed herein, the real-time information regarding the selected commodity may be received from a live feed. In addition, the real-time competition may have a set duration, and information regarding whether the competitive position corresponding to the criteria is consistent with the real-time information may be transmitted to the first user in real-time during the duration of the real-time competition. Furthermore, the information from the first user may include information corresponding to a wager based on the selection of the commodity and the competitive position corresponding to the criteria associated with the commodity.

Also, according to the disclosed embodiment, the outcome may be displayed to the first user on a computing device, and the outcome may be displayed as a virtual roulette wheel or a virtual slots machine, for example. In addition, the criteria associated with the commodity may be associated with the value of the commodity, and the competitive position may indicate whether the value of the commodity increases, decreases, or stays the same.

The above exemplary method according to the disclosed embodiment may also include receiving information from a second user including a second competitive position corresponding to the criteria associated with the commodity, determining, based at least in part on real-time information regarding the selected commodity, whether the second competitive position regarding the criteria is consistent with the real-time information, transmitting, information to the second user indicating an outcome that is favorable based at least in part of a determination that the second competitive position regarding the criteria is consistent with the real-time information, and transmitting information to the second user indicating an outcome that is not favorable based at least in part of a determination that the second competitive position regarding the criteria is not consistent with the real-time information.

The disclosed embodiment also relates to apparatus for enabling real-time competition based on commodities. An exemplary apparatus comprises one or more processors, and one or more memories operatively coupled to at least one of the one or more processors and having instructions stored thereon that, when executed by at least one of the one or more processors, cause at least one of the one or more processors to carry out one or more of the methods according to the disclosed embodiment.

The disclosed embodiment further relates to at least one non-transitory computer-readable medium storing computer-readable instructions that, when executed by one or more computing devices, cause at least one of the one or more computing devices to carry out one or more of the methods according to the disclosed embodiment.

BRIEF DESCRIPTION OF THE DRAWINGS

The disclosed embodiment relates to methods, apparatus, and computer-readable media for enabling real-time competition based on commodities.

FIG. 1 illustrates an exemplary method enabling real-time competition according to the disclosed embodiment.

FIGS. 4A-D illustrate exemplary selection grids according to the disclosed embodiment.

DETAILED DESCRIPTION

Figure 2A:
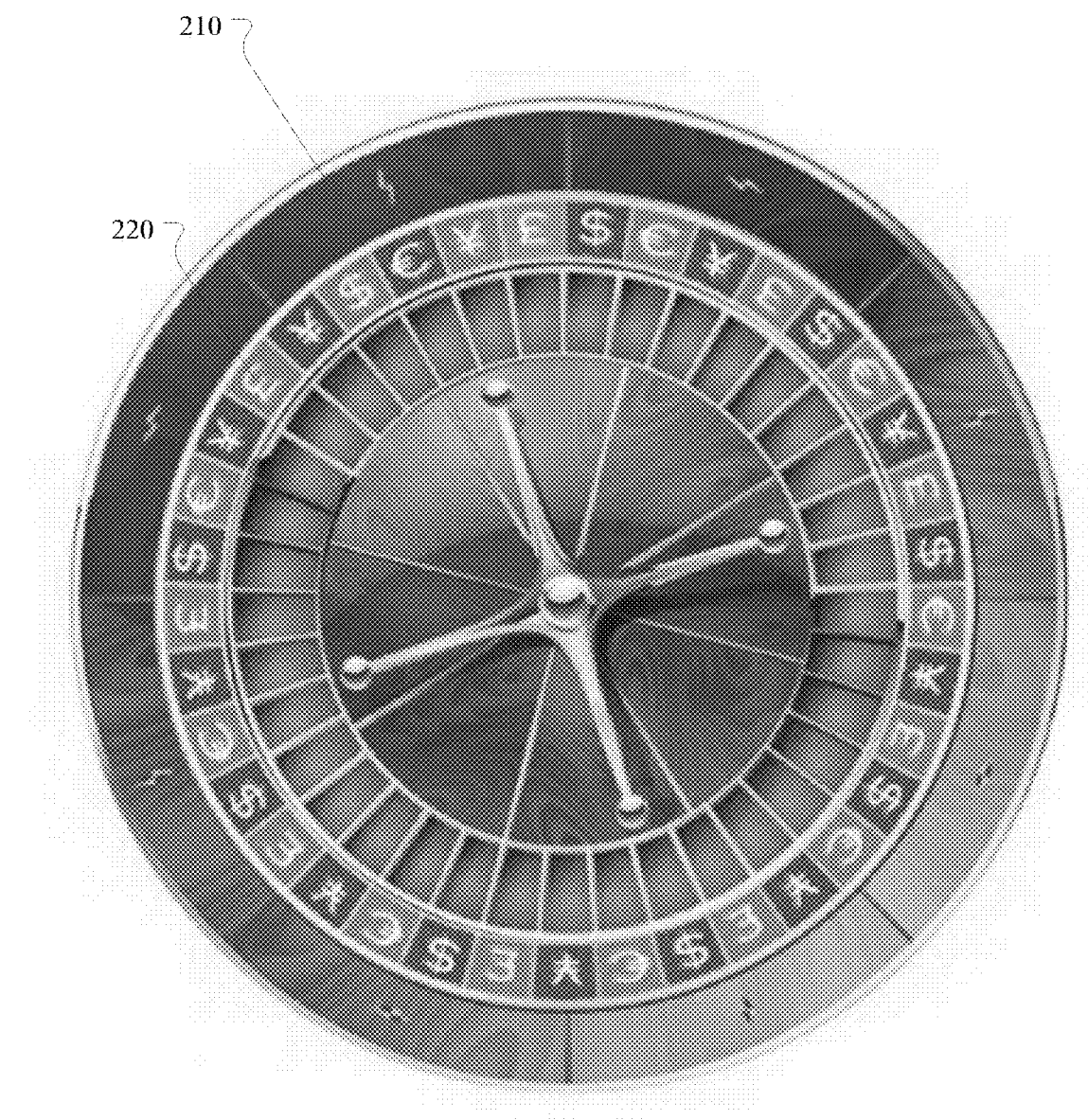
FIGS. 2A and 2B illustrate exemplary virtual roulette wheels according to the disclosed embodiment.

The disclosed embodiment relates to methods, apparatus, and computer-readable media for enabling real-time competition based on commodities. Commodities, as used herein, includes, for example, all types of global currencies, hard commodities such as precious metals and/or other metals (i.e. silver, gold, nickel, platinum, iron, steel, aluminum, copper, palladium, etc.), soft commodities such as agricultural products (i.e. cotton, wheat, corn, sugar, salt, rice, soybeans, coffee, rubber, livestock, etc.), energy commodities (i.e. electricity, crude and/or Brent oil, natural gas, coal, etc.), precious/semi precious gemstones, and the like. Essentially, anything that can change in value or be traded can be categorized as a commodity herein. Commodities as used herein can also include events such as natural events (i.e. weather prediction, periodic rainfall or lack thereof, storm prediction, earthquakes, hurricanes, tornados, floods, tsunamis, etc.) and financial fluctuations (i.e. stocks and/or shares in any stock market or regional economy (i.e. global stock markets, future markets, AIM Listed companies, etc.), real estate and/or property values, country or regional tax rates, interest rates, gross domestic product or any country, etc.). For each competitive area, criteria can include, as appropriate, commodities rising in value, falling in value, or holding a current value. In addition, criteria can relate to odds associated with one or more competitive positions.

According to the disclosed embodiment, one or more users may compete either against other users or against a non-user entity in a real-time event. In an exemplary scenario, users can challenge other users or a non-user entity to competitions based on fluctuations (i.e. rise, fall, stay) in the values of one or more commodities. Each user can then experience the competition in real-time through a user interface on a computing device associated with that user. For example, the competition may be presented to each user as a game of chance, including, for example, roulette, slots, and the like, with the outcome of the game being determined by the results of the fluctuations in the values of the one or more commodities. Fluctuations in the values of the commodities may be determined based on a global market perspective or relative to the value of one or more other commodities. For example, the competition may be based on fluctuations of the value of the currency of one country or region relative to the value of the currency of another country or region.

As an example, a user may choose for the value of the U.S. Dollar to rise. After the choice is made, the competition begins (i.e. roulette wheel spins, slots move, etc.). The result of the competition will indicate whether the value of the U.S. Dollar rises, and if so, the user wins. In the roulette example, the user wins if the ball lands in a slot reflecting the rise in the value of the U.S. dollar. In the slots example, the slots may stop on a jackpot result with one or more dollar signs reflecting the rise in the value of the U.S. Dollar. The competition may be based on any time period, such as a day of financial trading, with the game being decided when the financial market in a specific country or region closes for the day.

The competitive positions of each user are preferably compared with information regarding the real-time event, for example, from a live feed or other data source. During the course of the competition, which may have any suitable duration, the results of the comparisons between the live feed and the competitive positions of the different users can be displayed in real-time to provide the users with their current standings relative to each other user, and can also provide the final outcome of the competition at the conclusion of the competition. The duration of each competition may vary greatly, with exemplary durations being based on set periods of time, or any other duration.

More specifically, as shown in FIG. 1, an exemplary method of the disclosed embodiment enables real-time competition based on commodities. This method may be executed by any suitable computing device or computing devices, including, for example, servers or other centralized computing devices, user computing devices, and the like. In step 110, information is received from a first user or user device including a selection of a commodity and a competitive position corresponding to a criteria associated with the commodity. For example, a user may select the commodity gold, and the criteria may be the fluctuations in the global market over a time period of one hour. The competitive position may be that the value of gold will increase over the selected period of time. In step 120, it is determined, based at least in part on real-time information regarding the selected commodity, whether the competitive position regarding the criteria is consistent with the real-time information (i.e. did the value of gold rise over the selected period of time?). Decision step 130 reflects the outcome of this determination. If the competitive position regarding the criteria is consistent with the real-time information (i.e. the value of gold did in fact rise), information is transmitted to the first user indicating an outcome that is favorable in step 140. If the competitive position regarding the criteria is not consistent with the real-time information (i.e. the value of gold did not in fact rise), information is transmitted to the first user indicating an outcome that is not favorable in step 150.

In addition, the disclosed embodiment allows for the participation in more than one user or player in the real-time competition. For example, a second user may compete with the first user. In this scenario, using the above example, information is received from a second user including a second competitive position corresponding to the criteria associated with the commodity (i.e. the value of gold will fall over the selected period of time.). A determination is made, once again based at least in part on real-time information regarding the selected commodity, whether the second competitive position regarding the criteria is consistent with the real-time information. If the competitive position regarding the criteria is consistent with the real-time information (i.e. the value of gold did in fact fall), information is transmitted to the second user indicating an outcome that is favorable. If the competitive position regarding the criteria is not consistent with the real-time information (i.e. the value of gold did not in fact fall), information is transmitted to the second user indicating an outcome that is not favorable.

Thus, when more than one user participates, and there are variations in the competitive positions of the users, there will likely be one user that received a favorable outcome (i.e. the winner), and one user that received an outcome that is not favorable (i.e. the loser).

Another aspect of the disclosed embodiment enables users to place wagers based on the real-time competitions, with the winner of the competition being rewarded with winnings based on the wagers. In addition, one or more users may select criteria associated with odds associated with their wager, thereby increasing or decreasing the stakes associated with their wager.

There are also many variations of the real-time competitions of the disclosed embodiment, and the rules associated with the competitions can easily be modified to provide a wide range of competitions. This will allow the competitions to appeal to a wide range of players. Two examples include Turn Play (i.e. Each round can be as short as 2 minutes or as long as a week. This allows casual competition between long distance friends who play one round each day during lunch to hard core players who play 2 minute round speed competitions.) and Tournaments (i.e. Special events can created with playoff style tournaments. Players enter the field and compete to be the ultimate champion.).

The methods of the disclosed embodiment also enable a competition host, such as a centralized server or the like, to retain a percentage of the wagers as a fee for hosting and/or participating in the competition. Cheating can also be prevented by requiring advance payment of each wager, for example.

The disclosed embodiment further relates to collecting player data and play patterns for future use, such as targeted advertisements and other platform offerings, and to improve the platform experience to increase customer satisfaction.

Entertaining Displays

As described herein, the outcome may be displayed to one or more users on their respective computing devices, on computing devices viewed by multiple players, and the like. Exemplary displays include a virtual roulette wheel, a virtual slots machine, and the like. These displays can also be used as an interface to allow users to make their selections regarding commodities, criteria, competitive positions, and the like.

Roulette Wheel

Figure 2B:
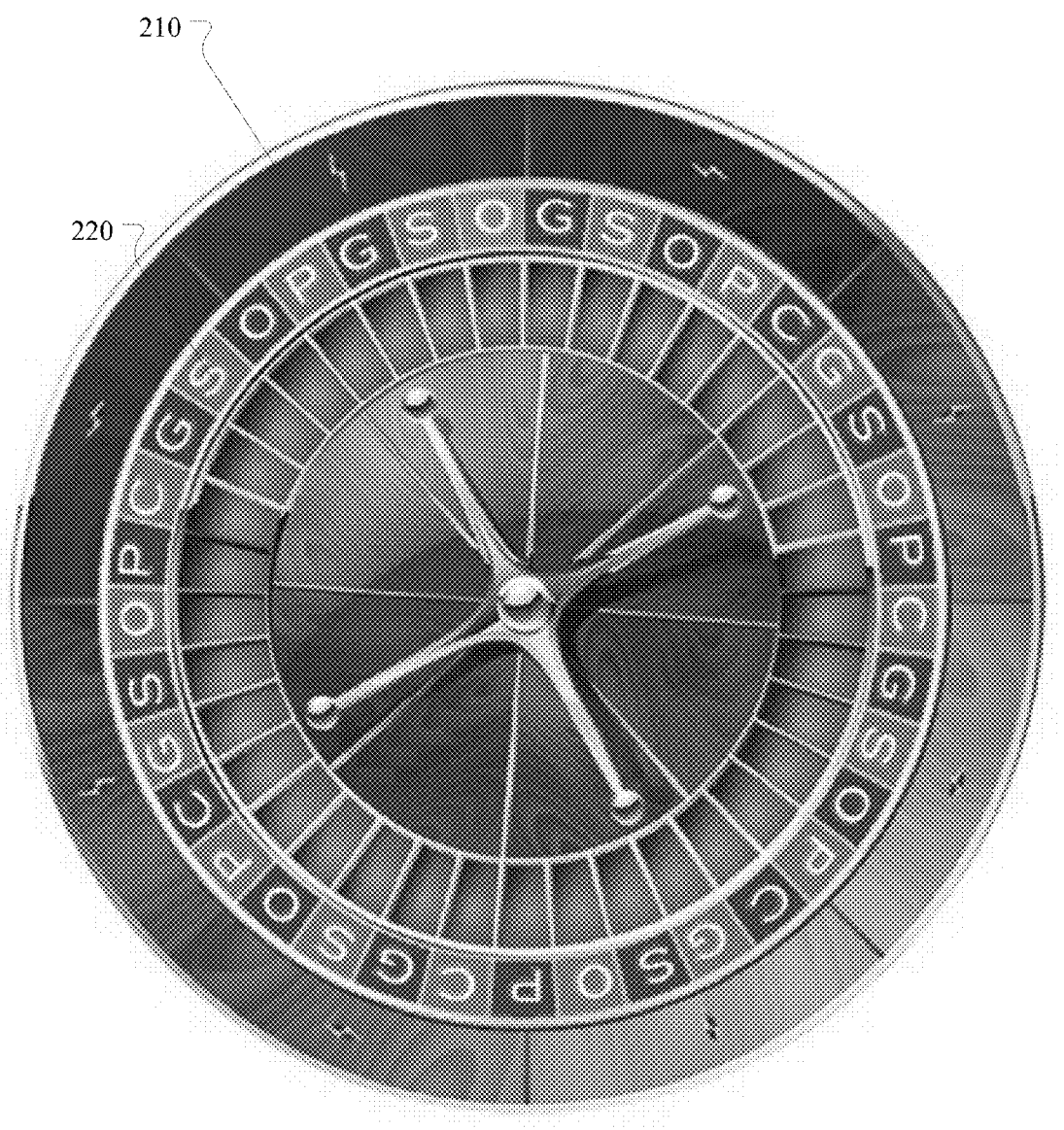

As indicated above, and as shown in FIGS. 2A and 2B, the competition may be displayed as a roulette wheel 210 with commodity symbols 220 (i.e. currency symbols, etc.) instead of numbers around the wheel. Any number of symbols or other variables may be used. Players can make their selections by choice, or make random selections, and may place wagers associated with their selections. After the competition begins, one or more balls or other objects may be spun around the wheel and come to rest at the conclusion of the competition in slots corresponding to the commodities.

Figure 3:
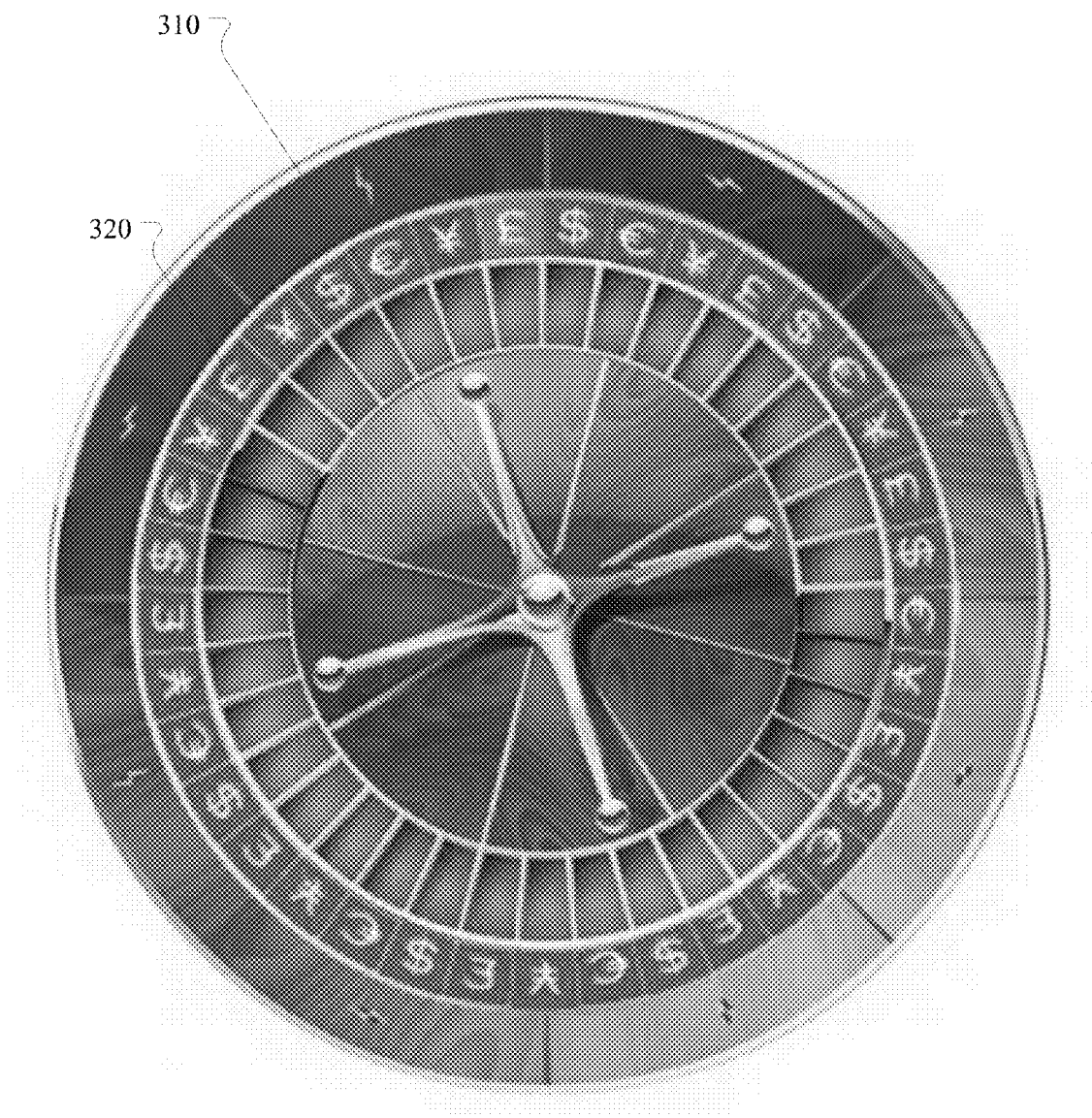
FIG. 3 illustrates an exemplary virtual roulette wheel according to the disclosed embodiment.
Figure 4A:
Figure 4B:
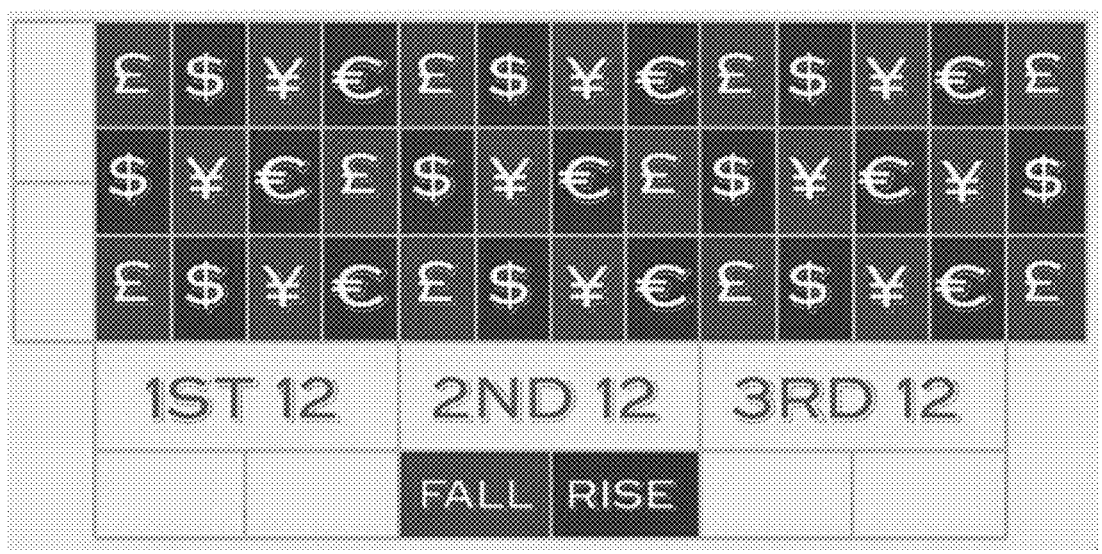
Figures 4C, 4D:
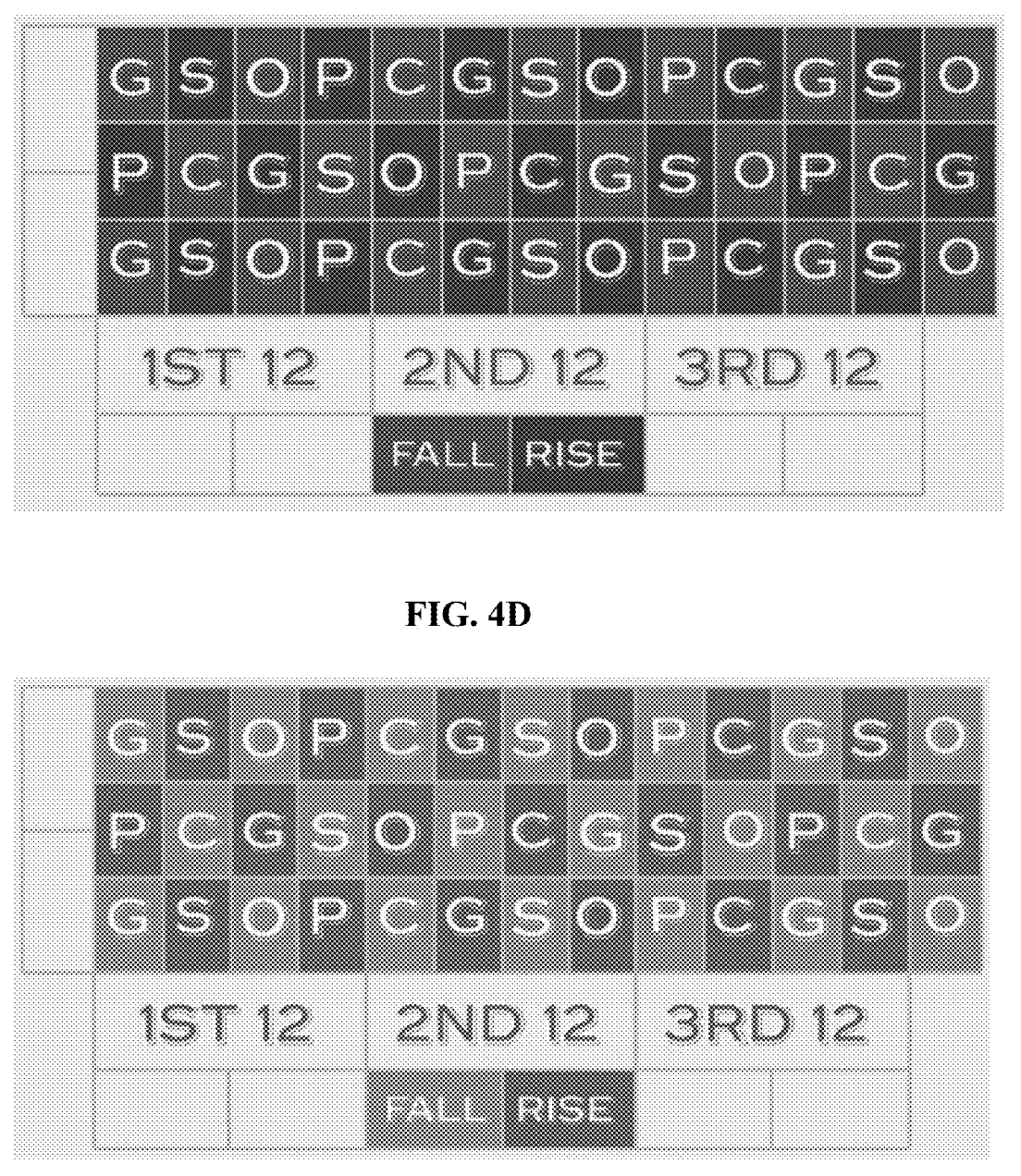

Wagers can be on for example but not limited to, which currency will Rise or Fall over the spin of the wheel, this can be determined by a live feed to the foreign exchange market, for example. FIG. 3 illustrates an exemplary roulette wheel 310 with variations in the positions on the wheel to indicate competitive positions 320 regarding each commodity. Selections can also be made using selection grids, such as those shown in FIGS. 4A-4D.

Wagers can also be placed on peer to peer or multiple players bets against the house or operator, for example but not limited to, which currencies will rise, fall, stay the same over the spin of the wheel or fixed amount of time, split wagers can be placed where a player or multiple players bet on one or more currencies rising/falling, staying the same either against another current or in General rising or falling in the market as a whole. In addition, if there are multiple grouped commodities in play (i.e. 24 commodities split into four groups of six), the player or players can place wagers on a particular group of currencies rising of falling over a period of time or spin of the wheel.

For example purposes, the fluctuations of the values of the commodities may be represented using any method, such as by color-coding (i.e. RED for falling currency, Green for Rising currencies, and any other color could be used for non-movement.

In addition to straight selections, a non-player entity or any other player may offer odds against each and all possibilities including but not limited to, Rising/Falling/non movement of any commodity in general, or against another player in particular.

Figure 5A:
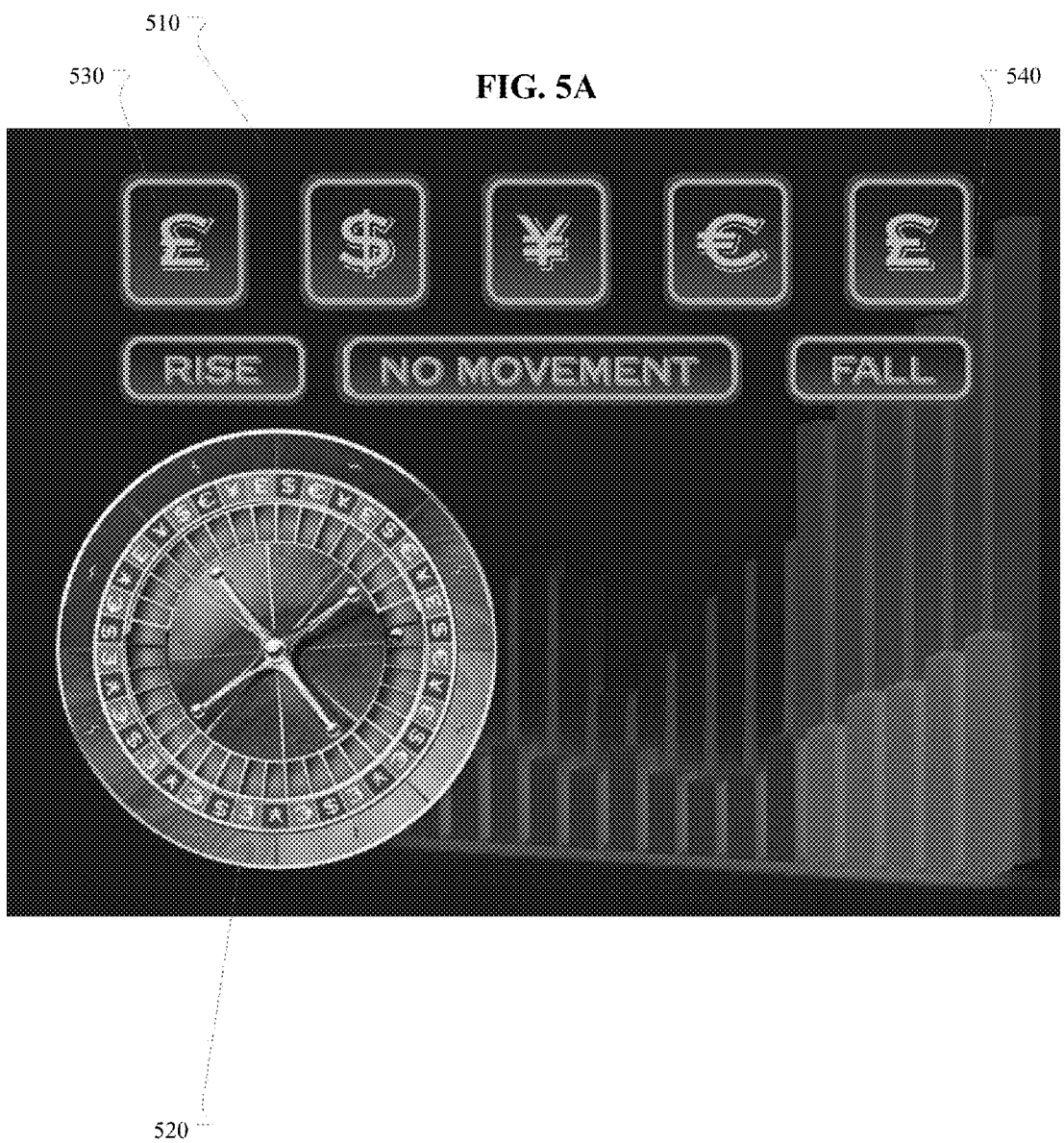
FIGS. 5A-B illustrate exemplary roulette wheel interfaces according to the disclosed embodiment.
Figure 5B:
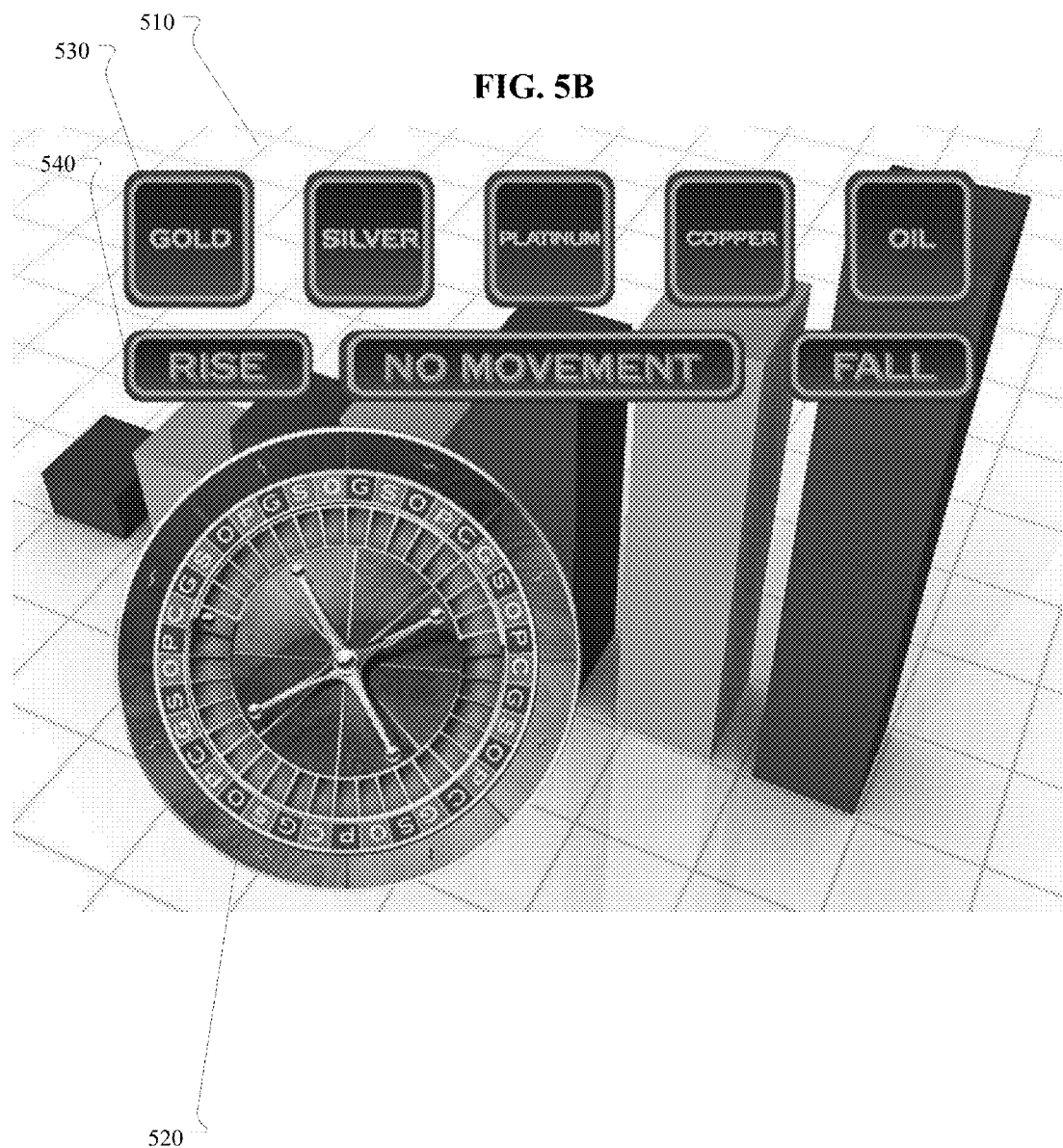

FIGS. 5A and 5B illustrate exemplary interfaces of the roulette wheel example according to the disclosed embodiment. As shown in these figures, the interface 510 may include an image of the roulette wheel 520, buttons or icons 530 that can be selected by a user or users, such as which commodities (i.e. currencies, precious metals, etc.) each user selects, and whether each user selects the selected commodities to rise, fall, or have no movement (540).

Slots

Figure 6A:
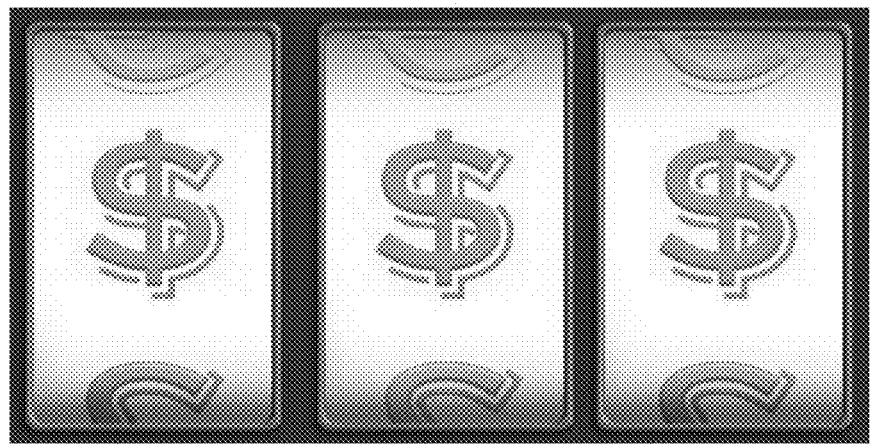
FIGS. 6A-C illustrate exemplary virtual slots machines according to the disclosed embodiment.
Figure 6B:
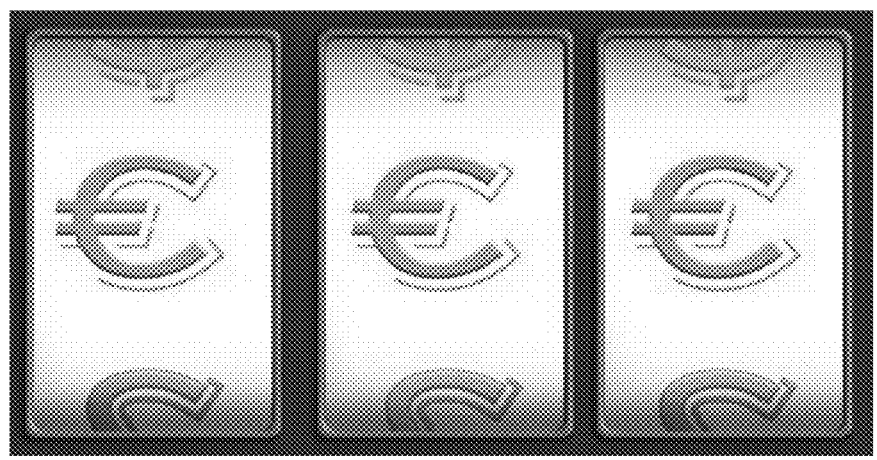
Figure 6C:
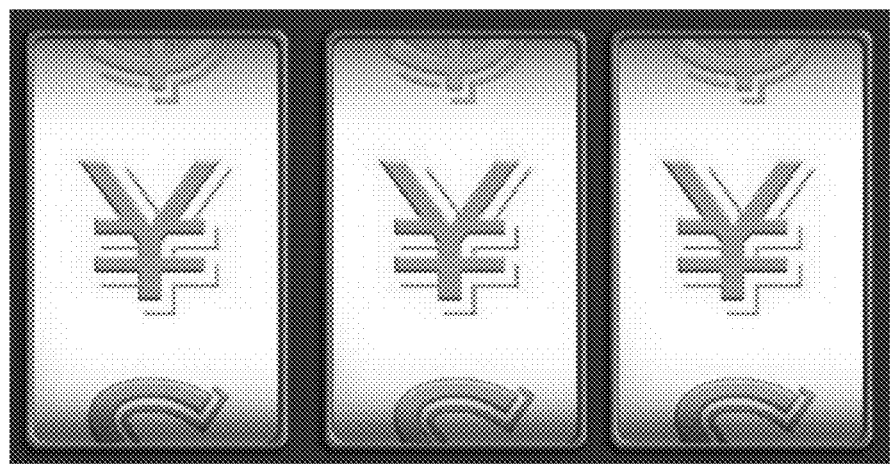
Figure 7A:
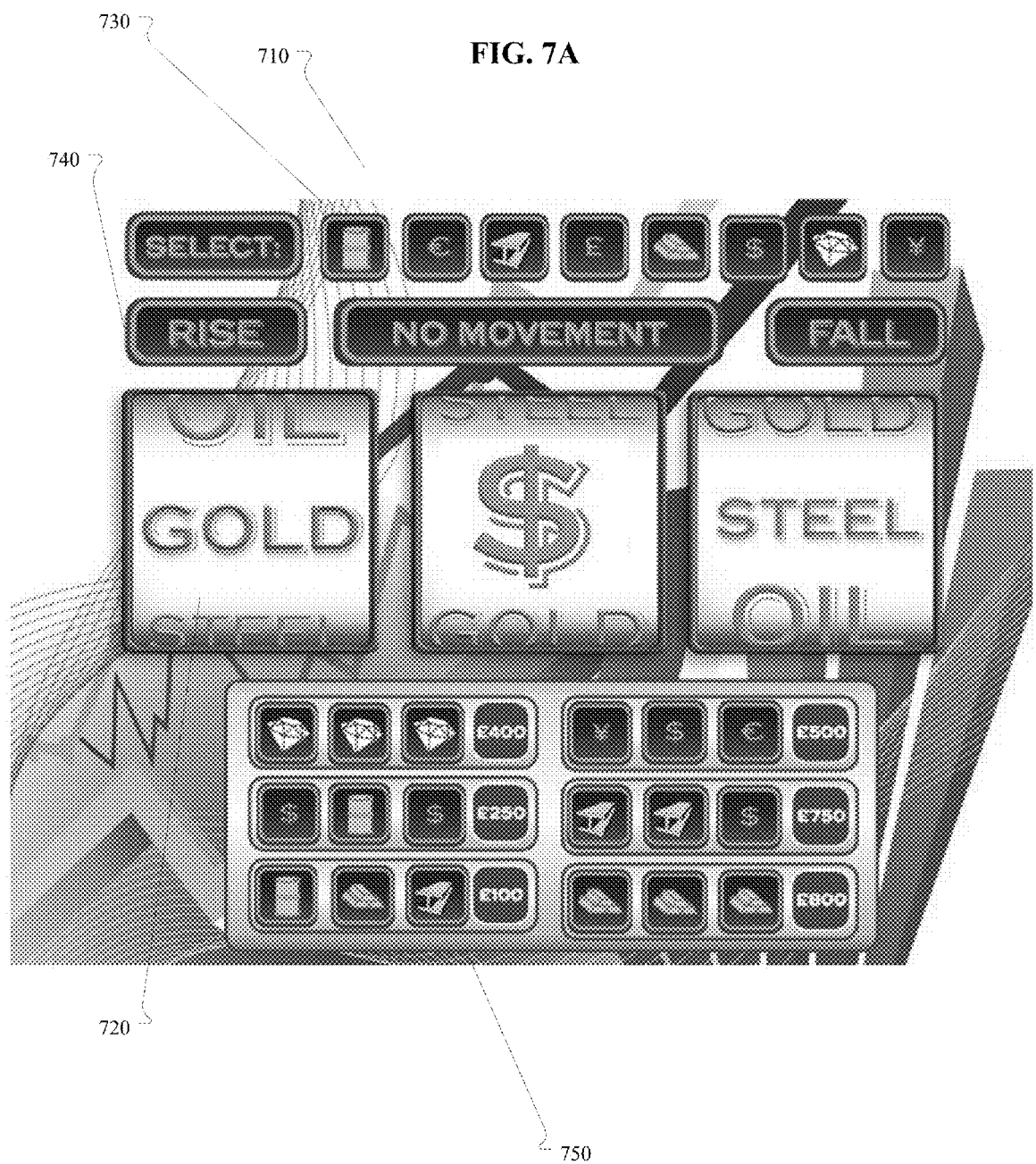
FIGS. 7A-G illustrate exemplary slot machine interfaces according to the disclosed embodiment.
Figure 7B:
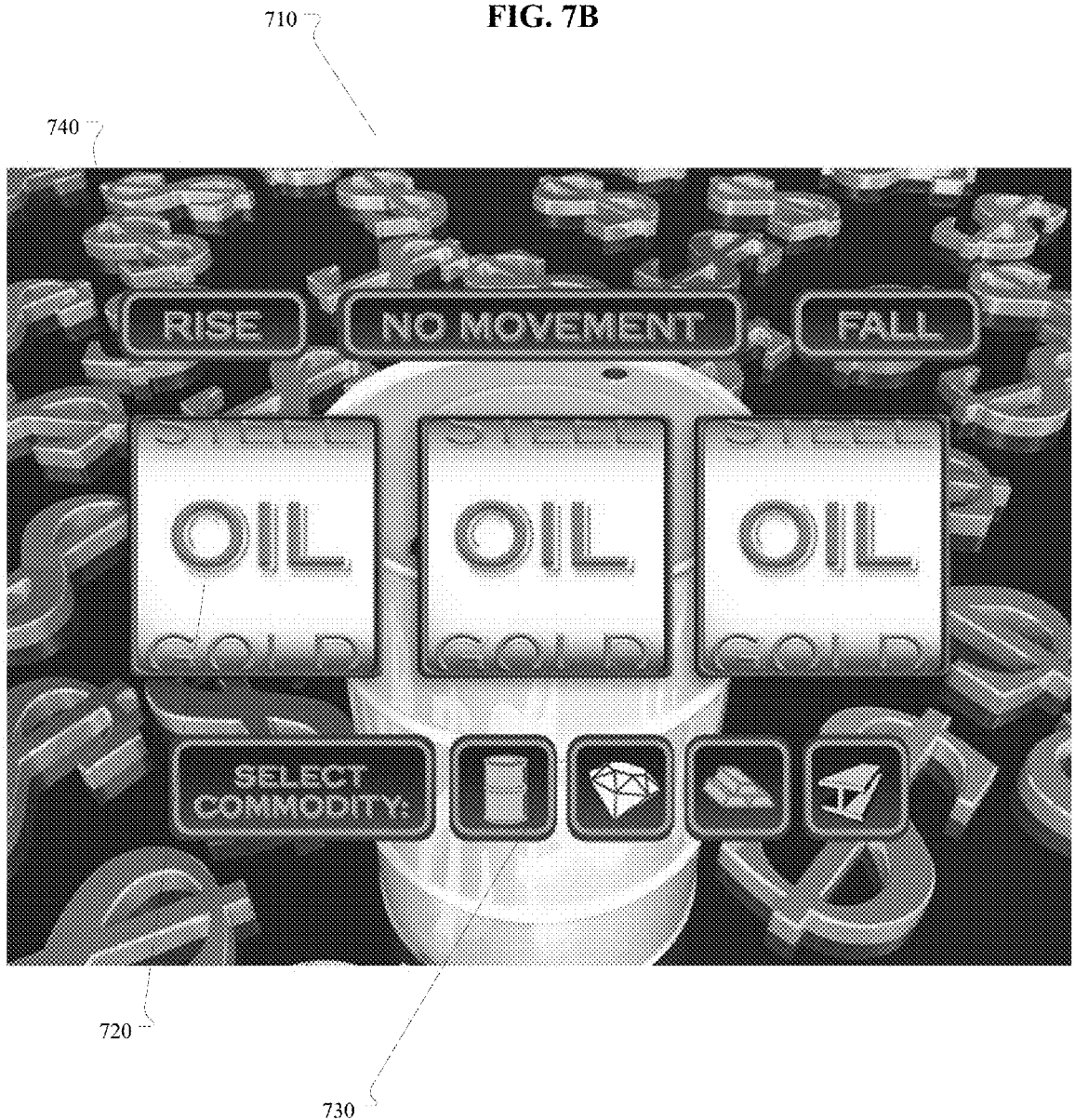
Figure 7C:
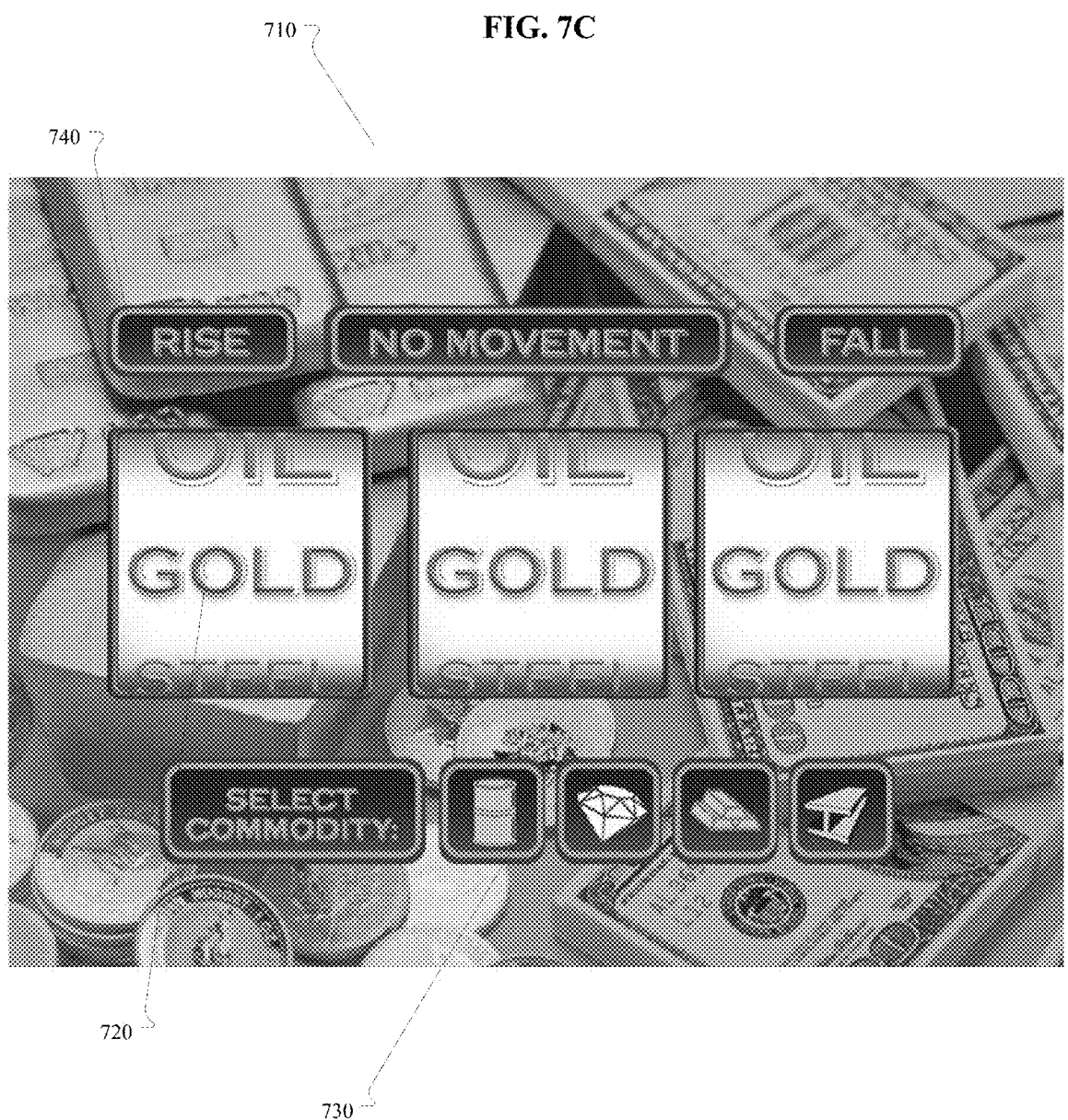
Figure 7D:
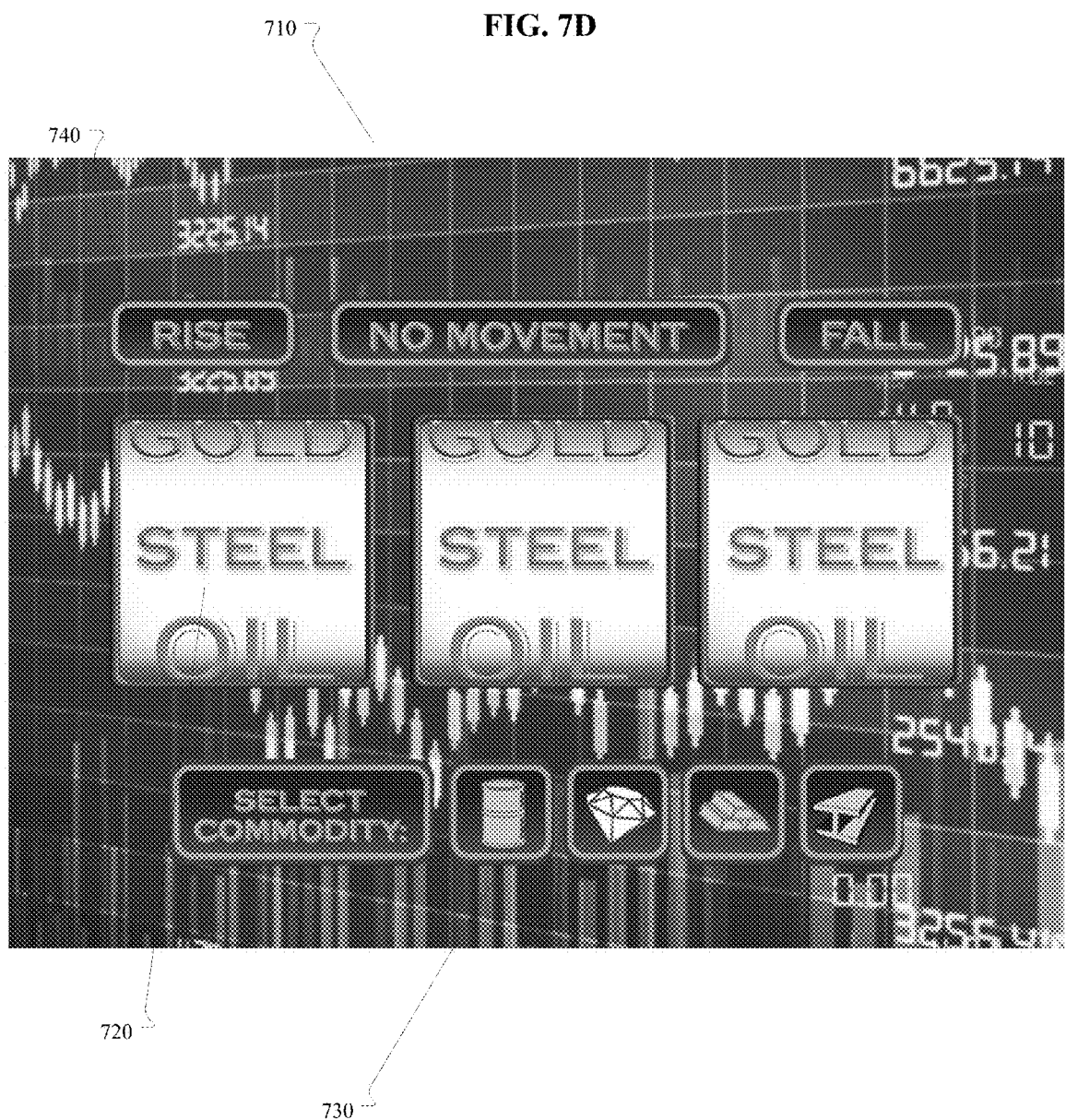
Figure 7E:
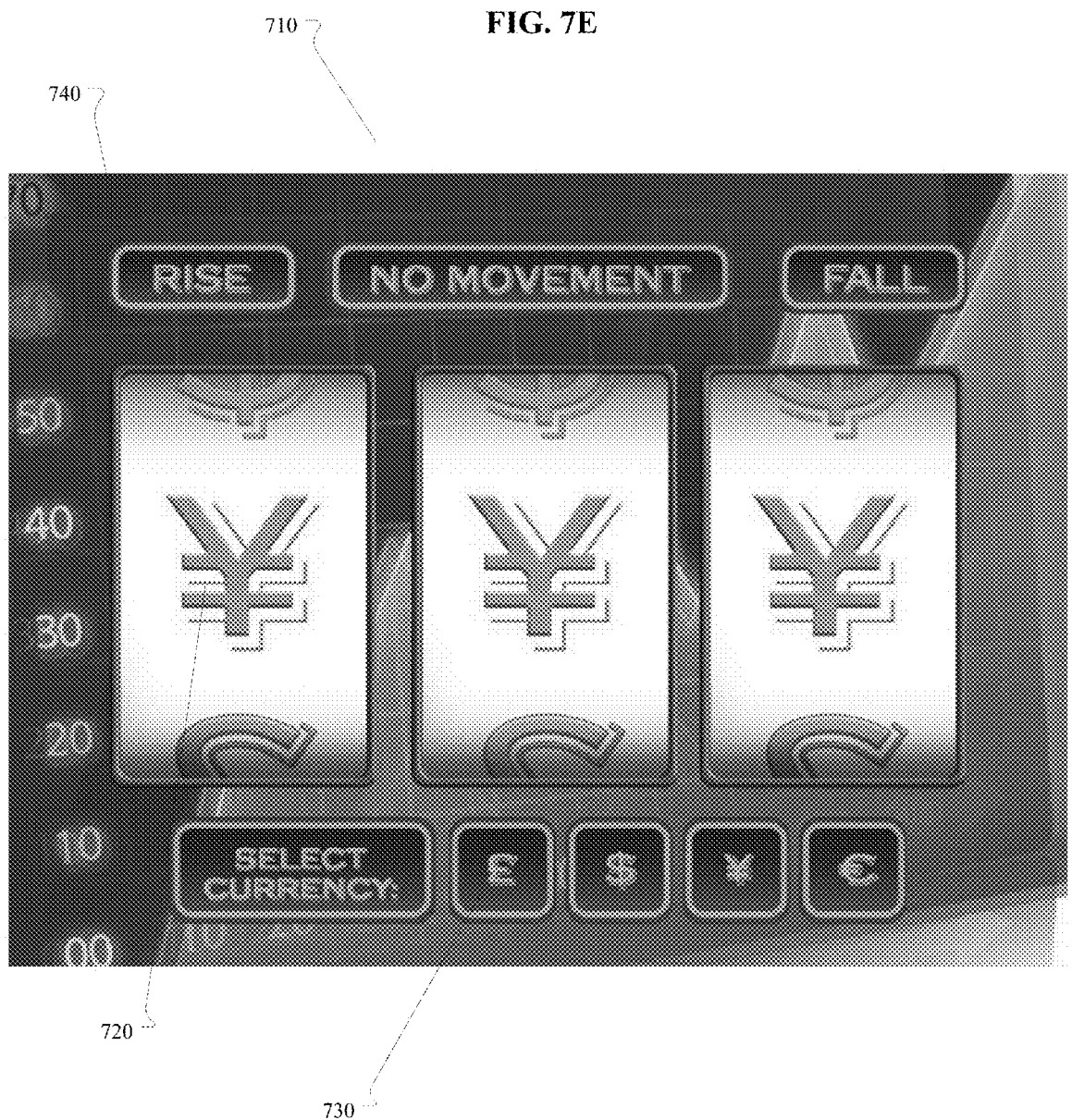
Figure 7F:
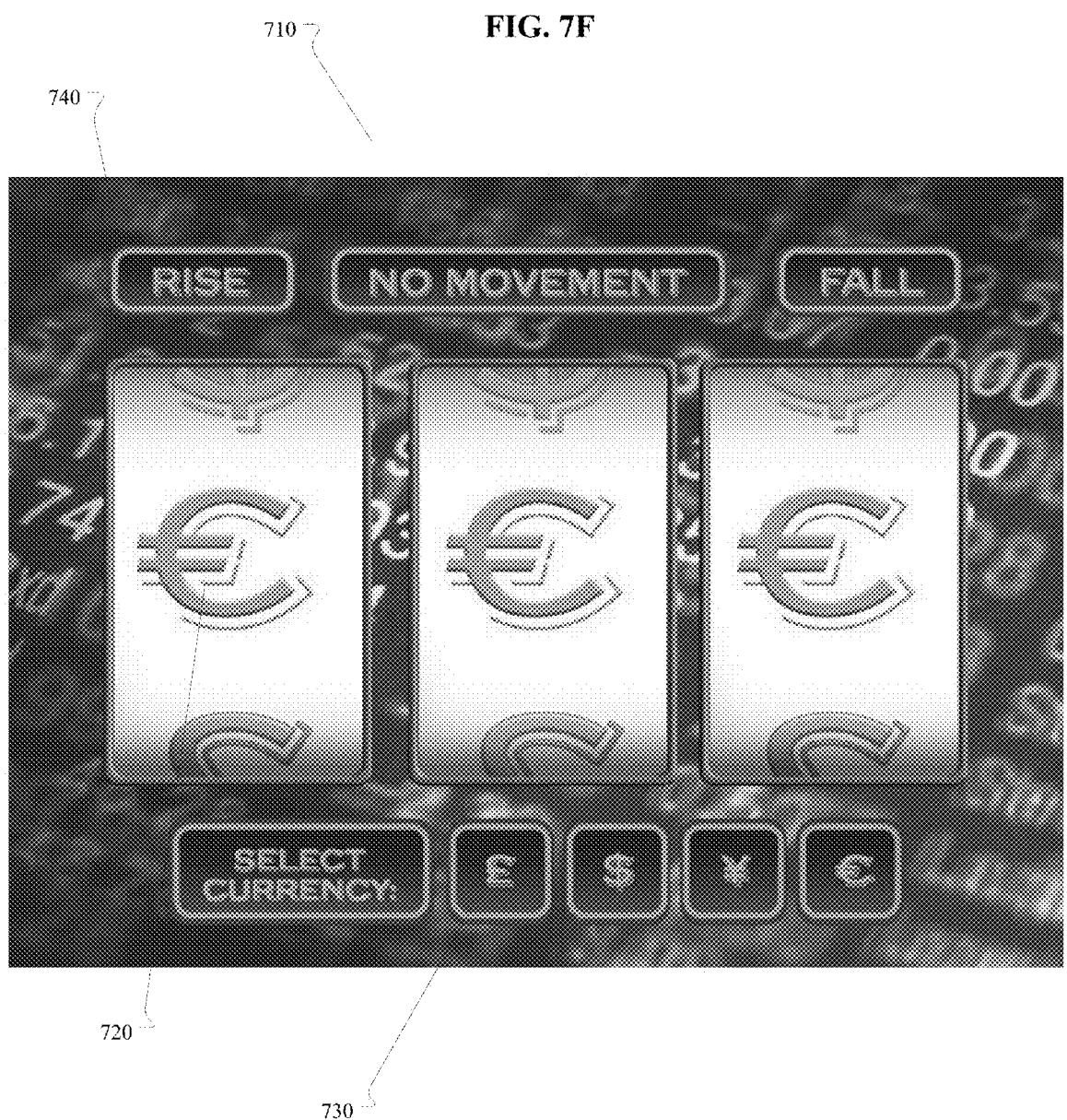
Figure 7G:
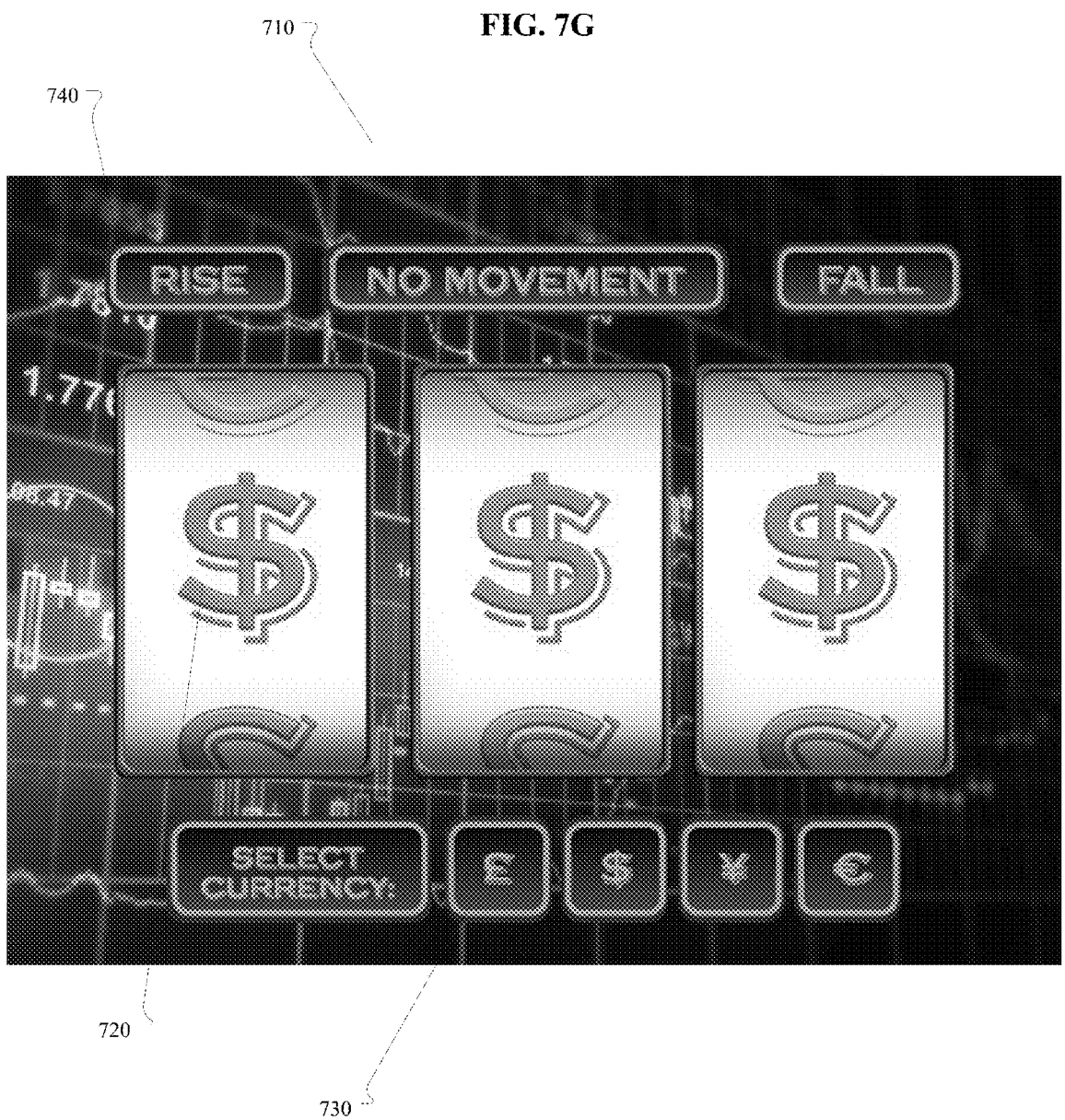

As indicated above, and shown in FIGS. 6A-6C, the competition may be displayed as a slots machine with commodity symbols (i.e. currency symbols, etc.). Any number of symbols or other variables may be used. Players can make their selections by choice, or make random selections, and may place wagers associated with their selections. When the competition begins, the symbols on the slots display may spin until coming to rest on a result reflecting the selected commodities.

Wagers can be on for example but not limited to, which currency will Rise or Fall over the spin of the slots, this can be determined by a live feed to the foreign exchange market, for example. Wagers can also be placed on peer to peer or multiple players bets against the house or operator, for example but not limited to, which currencies will rise, fall, stay the same over the spin of the slots or fixed amount of time, split wagers can be placed where a player or multiple players bet on one or more currencies rising/falling, staying the same either against another current or in General rising or falling in the market as a whole. In addition, if there are multiple grouped commodities in play (i.e. 24 commodities split into four groups of six), the player or players can place wagers on a particular group of currencies rising of falling over a period of time or spin of the slots.

For example purposes, the fluctuations of the values of the commodities may be represented using any method, such as by color-coding (i.e. RED for falling currency, Green for Rising currencies, and any other color could be used for non-movement.

In addition to straight selections, a non-player entity or any other player may offer odds against each and all possibilities including but not limited to, Rising/Falling/non movement of any commodity in general, or against another player in particular.

In addition to the above figures, FIGS. 7A-7G illustrate exemplary interfaces of the slots machine example according to the disclosed embodiment. As shown in these figures, the interface 710 may include a slots display 720, buttons or icons 730 that can be selected by a user or users, such as which commodities (i.e. currencies, precious metals, etc.) each user selects, whether each user selects the selected commodities to rise, fall, or have no movement (740), and in some cases, odds 750 associated with wagers.

In the scenario in which the competitions of the disclosed embodiment are broadcast or displayed to one or more users on televisions or the like, more than one user may view the broadcast. This is especially useful in an environment in which more than one user is watching the same broadcast of a competition, or when users in different locations are watching the same broadcast. When this occurs, the broadcast preferably includes the entire competition, either in a combined display, or in a split-screen or frame structure wherein the competition is displayed from the perspectives of each user. For example, if the competition is broadcast in a restaurant, bar, casino, etc., a single television may display the competition for a plurality of users, and each user would preferably be able to determine, from the broadcast, their current standing in the competition. In addition, using this configuration makes it easy for existing users to leave the competition or new users to join the competition, for example, between rounds of play.

Another aspect of the disclosed embodiment enables users to place wagers based on the fluctuations of the values of the commodities, with the winner of the competition being rewarded with winnings based on the wagers. In addition, one or more users may give odds associated with their wager, thereby increasing or decreasing the stakes associated with their wager. For example, wagers may be based on the rate of growth of a particular commodity, overall growth over a period of time, and the like.

The methods of the disclosed embodiment also enable the game host, such as a gaming server or the like, to retain a percentage of the wagers as a fee for playing the game. Cheating can also be prevented by requiring advance payment of each wager, for example.

The disclosed embodiment further relates to collecting player data and play patterns for future use, such as targeted advertisements and other platform offerings, and to improve the platform experience to increase customer satisfaction.

Figure 8:
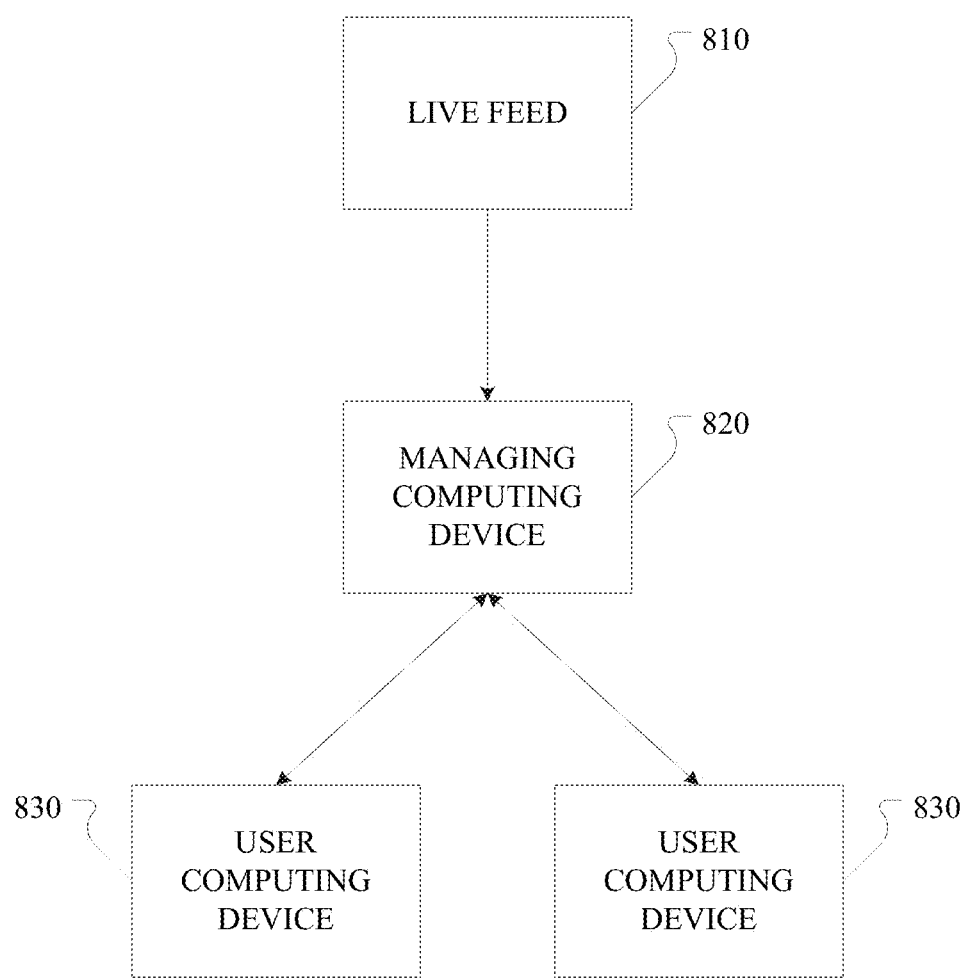
FIG. 8 illustrates an exemplary arrangement according to the disclosed embodiment in which competitions are managed by one or more managing computing devices.

As described herein, and shown in FIG. 8 below, the competitions may be managed by one or more managing computing devices 820, such as a server and the like, with data being transmitted back and forth between user computing devices 830 and managing computing devices 820, as needed, to enable the real-time competitions of the disclosed embodiment. In this configuration, a live feed 810 preferably provides information associated with the commodities to managing computing devices 820, which in turn, transmits the information, as appropriate, to the user computing devices 830.

Figure 9:
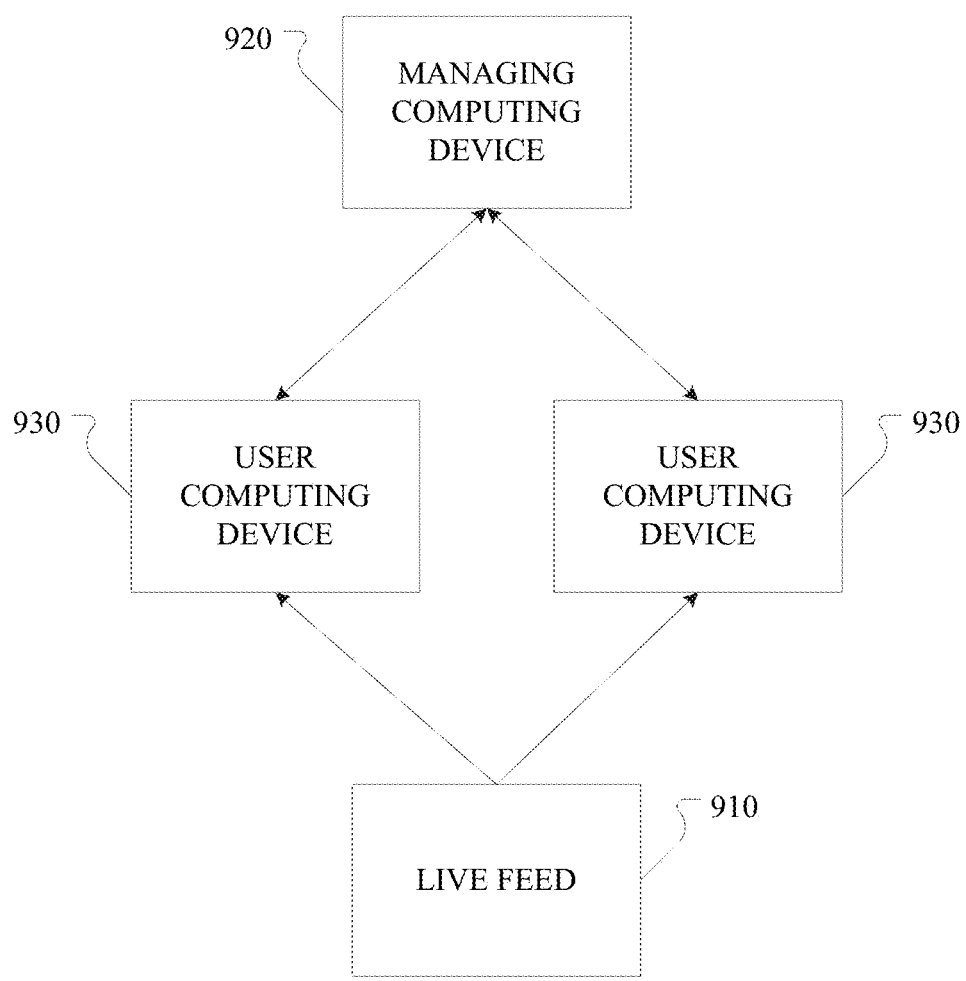
FIG. 9 illustrates an exemplary arrangement according to the disclosed embodiment in which competitions are managed by one or more managing computing devices.

In an alternative configuration shown in FIG. 9 below, the competitions may be managed by one or more managing computing devices 920, such as a server and the like, with data being transmitted back and forth between user computing devices 930 and managing computing devices 920, as needed, to enable the real-time competitions of the disclosed embodiment. In this configuration, a live feed 910 preferably provides information associated with the commodities directly to one or more of user computing devices 930, which can, if appropriate, transmit the information to managing computing devices 920.

Figure 10:
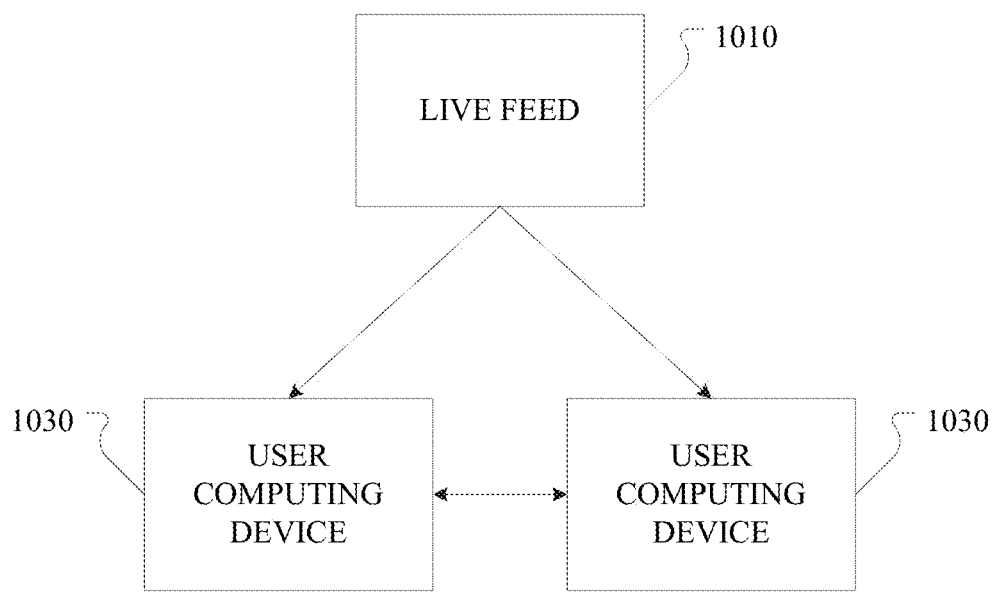
FIG. 10 illustrates an exemplary arrangement according to the disclosed embodiment in which competitions are managed by one or more user computing devices without a managing computing device.

In another alternative configuration shown in FIG. 10 below, the competitions may be managed by one or more of user computing devices 1030 without a managing computing device being required. In this scenario, data can be transmitted back and forth between user computing devices 1030, as needed, to enable the real-time competitions of the disclosed embodiment. In this configuration, a live feed 1010 preferably provides information associated with the commodities directly to one or more of user computing devices 1030.

Computing Environment

The disclosed embodiment may be implemented on any suitable platform, including, for example, web-based applications, mobile applications, software, and the like, and may be accessed by users using any suitable computing device including, for example, computers, tablets, smart phones, mobile phone, PDA's, or any other suitable computing device. Exemplary computing devices include, for example, Apple-based computing devices (i.e. iMacs, iPhones, iPads, etc.), Android-based computing devices, Windows-based computing systems, and the like. The competitions of the disclosed embodiment may also be broadcast or displayed to one or more users on televisions or the like, for example, on a dedicated channel.

The methods of the disclosed embodiment are preferably computer-implemented and executed by one or more computing devices. In addition, the disclosed embodiment relates to apparatus comprising one or more processors and one or more memories operatively coupled to at least one of the one or more processors. The memories of an exemplary apparatus have instructions stored thereon that, when executed by at least one of the one or more processors, cause at least one of the one or more processors to carry out the steps of the exemplary methods. The disclosed embodiment further relates to non-transitory computer-readable media storing computer-readable instructions that, when executed by at least one of one or more computing devices, cause at least one of the one or more computing devices to carry out the steps of the exemplary methods.

Figure 11:
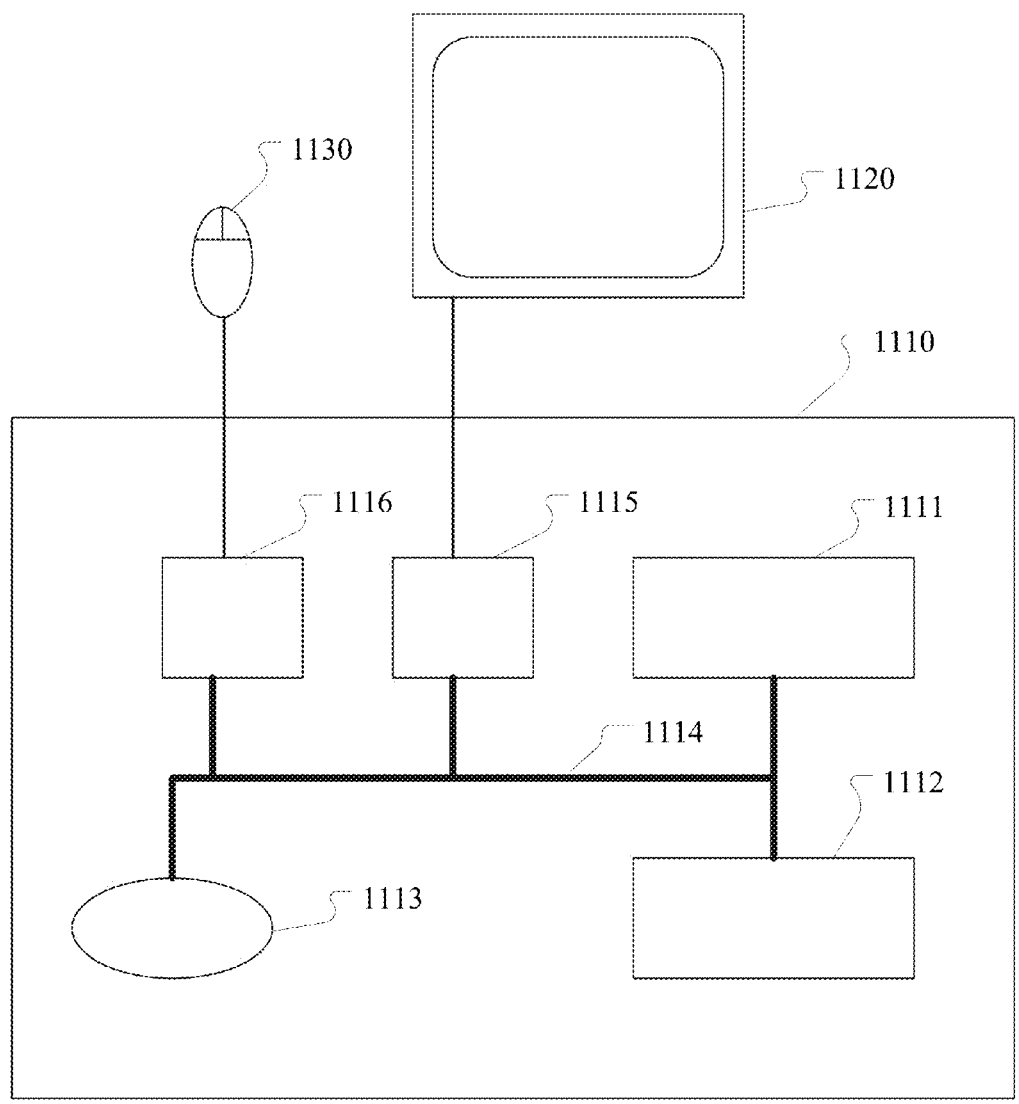
FIG. 11 illustrates an exemplary computing environment according to the disclosed embodiment.

The embodiments described herein may be implemented with any suitable hardware and/or software configuration, including, for example, modules executed on computing devices such as computing device 1110 of FIG. 11. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 1110 has one or more processing device 1111 designed to process instructions, for example computer readable instructions (i.e., code) stored on a storage device 1113. By processing instructions, processing device 1111 may perform the steps set forth in the methods described herein. Storage device 1113 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 1110 additionally has memory 1112, an input controller 1116, and an output controller 1115. A bus 1114 operatively couples components of computing device 1110, including processor 1111, memory 1112, storage device 1113, input controller 1116, output controller 1115, and any other devices (e.g., network controllers, sound controllers, etc.). Output controller 1115 may be operatively coupled (e.g., via a wired or wireless connection) to a display device 1120 (e.g., a monitor, television, mobile device screen, touch-display, etc.) In such a fashion that output controller 1115 can transform the display on display device 1120 (e.g., in response to modules executed). Input controller 1116 may be operatively coupled (e.g., via a wired or wireless connection) to input device 1130 (e.g., mouse, keyboard, touch-pad, scroll-ball, touch-display, etc.) In such a fashion that input can be received from a user (e.g., a user may input with an input device 1130 a dig ticket).

Of course, FIG. 11 illustrates computing device 1110, display device 1120, and input device 1130 as separate devices for ease of identification only. Computing device 1110, display device 1120, and input device 1130 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 1110 may be one or more servers, for example a farm of networked servers, a clustered server environment, or a cloud network of computing devices.

While systems and methods are described herein by way of example and embodiments, those skilled in the art recognize that the disclosed embodiment is not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A computer-implemented method executed by one or more computing devices for enabling real-time competition between a first user and a second user based on commodities or currencies, the method comprising:
    receiving, by at least one of the one or more computing devices, information from a first user including a selection of a first commodity or currency and a second commodity or currency, a first competitive position, and odds corresponding to the first competitive position, the first competitive position corresponding to whether a value of the first commodity or currency will rise, fall, or remain the same relative to a value of the second commodity or currency over a specified duration of time, the specified duration of time having a start time and an end time;
    receiving, by at least one of the one or more computing devices, information from a second user including an acceptance of the odds corresponding to the first competitive position and a second competitive position, the second competitive position also indicating whether the value of the first commodity or currency will rise, fall, or remain the same relative to the value of the second commodity or currency over the specified duration of time, wherein the first competitive position and the second competitive position are mutually exclusive;
    enabling, by at least one of the one or more computing devices, a real-time competition based on the first competitive position and the second competitive position, the real-time competition including the display of an entertaining experience on a computing device associated with at least one of the first user and the second user during the specified duration of time, the entertaining experience indicating a real-time state of the first competitive position relative to the second competitive position, the real-time state corresponding to a first state in which the first competitive position is consistent with a real-time value of the first commodity or currency relative to a real-time value of the second commodity or currency, a second state in which the second competitive position is consistent with the real-time value of the first commodity or currency relative to the real-time value of the second commodity or currency, or a third state in which neither the first competitive position nor the second competitive position is consistent with the real-time value of the first commodity or currency relative to the real-time value of the second commodity or currency;
    transmitting, by at least one of the one or more computing devices, after the end time of the specified duration of time, information to the first user and the second user indicating either:
        an outcome that is favorable for the first user based at least in part on a determination that the first competitive position is consistent with the real-time value of the first commodity or currency relative to the real-time value of the second commodity or currency at the end time of the specified duration of time, or
        an outcome that is favorable for the second user based at least in part on a determination that the second competitive position is consistent with the real-time value of the first commodity or currency relative to the real-time value of the second commodity or currency at the end time of the specified duration of time.

2. The method of claim 1, wherein the real-time information regarding the first commodity or currency and the second commodity or currency is received from a live feed.

3. The method of claim 1, wherein the specified duration of time is a fixed time interval.

4. The method of claim 1, wherein the information from the first user further includes information corresponding to a wager based on the selection of the first commodity or currency and the second commodity or currency and the first competitive position.

5. The method of claim 1, wherein the outcome is displayed as part of the entertaining experience.

6. The method of claim 5, wherein the entertaining experience includes a virtual roulette wheel.

7. The method of claim 5, wherein the entertaining experience includes a virtual slots machine.

8. An apparatus for enabling real-time competition between a first user and a second user based on commodities or currencies, the apparatus comprising:
    one or more processors; and
    one or more memories operatively coupled to at least one of the one or more processors and having instructions stored thereon that, when executed by at least one of the one or more processors, cause at least one of the one or more processors to:
        enable the receipt of information from a first user including a selection of a first commodity or currency and a second commodity or currency, a first competitive position, and odds corresponding to the first competitive position, the first competitive position corresponding to whether a value of the first commodity or currency will rise, fall, or remain the same relative to a value of the second commodity or currency over a specified duration of time, the specified duration of time having a start time and an end time
        enable the receipt of information from a second user including an acceptance of the odds corresponding to the first competitive position and a second competitive position, the second competitive position also indicating whether the value of the first commodity or currency will rise, fall, or remain the same relative to the value of the second commodity or currency over the specified duration of time, wherein the first competitive position and the second competitive position are mutually exclusive;
        enable a real-time competition based on the first competitive position and the second competitive position, the real-time competition including the display of an entertaining experience on a computing device associated with at least one of the first user and the second user during the specified duration of time, the entertaining experience indicating a real-time state of the first competitive position relative to the second competitive position, the real-time state corresponding to a first state in which the first competitive position is consistent with a real-time value of the first commodity or currency relative to a real-time value of the second commodity or currency, a second state in which the second competitive position is consistent with the real-time value of the first commodity or currency relative to the real-time value of the second commodity or currency, or a third state in which neither the first competitive position nor the second competitive position is consistent with the real-time value of the first commodity or currency relative to the real-time value of the second commodity or currency;

transmit, after the end time of the specified duration of time, information to the first user and the second user indicating either:

an outcome that is favorable for the first user based at least in part on a determination that the first competitive position is consistent with the real-time value of the first commodity or currency relative to the real-time value of the second commodity or currency at the end time of the specified duration of time, or an outcome that is favorable for the second user based at least in part on a determination that the second competitive position is consistent with the real-time value of the first commodity or currency relative to the real-time value of the second commodity or currency at the end time of the specified duration of time.

9. The apparatus of claim 8, wherein the real-time information regarding the first commodity or currency and the second commodity or currency is received from a live feed.

10. The apparatus of claim 8, wherein the specified duration of time is a fixed time interval.

11. The apparatus of claim 8, wherein the information from the first user further includes information corresponding to a wager based on the selection of the first commodity or currency and the second commodity or currency and the first competitive position.

12. The apparatus of claim 8, wherein the outcome is displayed as part of the entertaining experience.

13. The apparatus of claim 12, wherein the entertaining experience includes a virtual roulette wheel.

14. The apparatus of claim 12, wherein the entertaining experience includes a virtual slots machine.

15. At least one non-transitory computer-readable medium storing computer-readable instructions that, when executed by one or more computing devices, cause at least one of the one or more computing devices to:

receive information from a first user including a selection of a first commodity or currency and a second commodity or currency, a first competitive position, and odds corresponding to the first competitive position, the first competitive position corresponding to whether a value of the first commodity or currency will rise, fall, or remain the same relative to a value of the second commodity or currency over a specified duration of time, the specified duration of time having a start time and an end time;

receive information from a second user including an acceptance of the odds corresponding to the first competitive position and a second competitive position, the second competitive position also indicating whether the value of the first commodity or currency will rise, fall, or remain the same relative to the value of the second commodity or currency over the specified duration of time, wherein the first competitive position and the second competitive position are mutually exclusive;

enable a real-time competition based on the first competitive position and the second competitive position, the real-time competition including the display of an entertaining experience on a computing device associated with at least one of the first user and the second user during the specified duration of time, the entertaining experience indicating a real-time state of the first competitive position relative to the second competitive position, the real-time state corresponding to a first state in which the first competitive position is consistent with a real-time value of the first commodity or currency relative to a real-time value of the second commodity or currency, a second state in which the second competitive position is consistent with the real-time value of the first commodity or currency relative to the real-time value of the second commodity or currency, or a third state in which neither the first competitive position nor the second competitive position is consistent with the real-time value of the first commodity or currency relative to the real-time value of the second commodity or currency;

transmit, after the end time of the specified duration of time, information to the first user and the second user indicating either:

an outcome that is favorable for the first user based at least in part on a determination that the first competitive position is consistent with the real-time value of the first commodity or currency relative to the real-time value of the second commodity or currency at the end time of the specified duration of time, or an outcome that is favorable for the second user based at least in part on a determination that the second competitive position is consistent with the real-time value of the first commodity or currency relative to the real-time value of the second commodity or currency at the end time of the specified duration of time.

16. The at least one non-transitory computer-readable medium of claim 15, wherein the real-time information regarding the first commodity or currency and the second commodity or currency is received from a live feed.

17. The at least one non-transitory computer-readable medium of claim 15, wherein the specified duration of time is a fixed time interval.

18. The at least one non-transitory computer-readable medium of claim 15, wherein the information from the first user further includes information corresponding to a wager based on the selection of the first commodity or currency and the second commodity or currency and the first competitive position.

19. The at least one non-transitory computer-readable medium of claim 15, wherein the outcome is displayed as part of the entertaining experience.

20. The at least one non-transitory computer-readable medium of claim 19, wherein the entertaining experience includes a virtual roulette wheel.

21. The at least one non-transitory computer-readable medium of claim 19, wherein the entertaining experience includes a virtual slots machine.

* * * * *